United States Patent [19]
Lashbrook, Jr. et al.

[11] Patent Number: 5,515,914
[45] Date of Patent: May 14, 1996

[54] CERAMIC HEAT EXCHANGER DESIGN

[75] Inventors: James A. Lashbrook, Jr., South Orleans; Alan R. Holm, Sutton; Kent R. Coston, Hubbardston, all of Mass.

[73] Assignee: Saint Gobain/Norton Industrial Ceramics Corp., Worcester, Mass.

[21] Appl. No.: 236,777

[22] Filed: Apr. 29, 1994

[51] Int. Cl.$^6$ .................................................. F28F 9/04
[52] U.S. Cl. ........................ 165/178; 165/DIG. 433; 165/DIG. 477; 285/423
[58] Field of Search ........................... 165/158, 178; 285/212, 341, 351, 423

[56] References Cited

U.S. PATENT DOCUMENTS

| 1,429,149 | 9/1922 | Lawrence. | |
|---|---|---|---|
| 4,029,465 | 6/1977 | LaHaye et al. | 432/179 |
| 4,106,556 | 8/1978 | Heyn et al. | 165/81 |
| 4,122,894 | 10/1978 | Laws et al. | 165/76 |
| 4,144,020 | 3/1979 | LaHaye | 432/19 |
| 4,449,575 | 5/1984 | Laws et al. | 165/82 |
| 4,632,181 | 12/1986 | Graham | 165/158 |

FOREIGN PATENT DOCUMENTS 2440535  3/1976  Germany ........................ 165/158

*Primary Examiner*—Allen J. Flanigan
*Attorney, Agent, or Firm*—Thomas M. DiMauro

[57] ABSTRACT

An annular seal for use in a heat exchanger connection comprising a tube and at least one annular seal, wherein the annular seal is compression seated upon the outside diameter of the tube.

18 Claims, 5 Drawing Sheets

CERAMIC HEAT EXCHANGER DESIGN

BACKGROUND OF THE INVENTION

The high cost of energy has led industry to extract usable heat from high temperature waste streams whenever practical. In practice, a heated waste stream passes over conventional crossflow heat exchanger tubes through which uncontaminated ambient air is flown. The uncontaminated ambient air is heated by the waste stream and then used in many applications, including facility heat and process heat such as wood chip drying and combustion preheating.

Initially, heat extraction from high temperature waste streams employed metal-tubed heat exchangers. However, three particular problems with metal tubes were immediately observed. First, the temperature limit of the metals was exceeded by the operating temperature of the heat exchanger. Second, the waste streams were frequently abrasive and/or corrosive and so posed a danger to the physical integrity of the metallic tubes. Third, the metallic tubes were typically positioned by welding them to the receiving walls of the heat exchanger, thereby hindering their ease of individual replacement.

In response to these concerns, high temperature-, abrasion- and corrosion-resistant ceramic tubes were developed to replace the metal tubes. However, because ceramics can not be welded to receiving walls, a potential for air leaks from the gap between the ceramic tube and the receiving wall was realized.

U.S. Pat. No. 4,632,181 ("the Graham patent") discloses a ceramic heat exchanger having a number of features which purport to solve these problems. See FIG. 1. A first feature is a bell-shaped threaded insert which screws into the receiving wall and exerts axial pressure upon the end of each ceramic tube, thereby stabilizing and providing easy access to the tube. A second feature of the Graham heat exchanger is a gasket placed between the ceramic tube and the insert to provide a sealing engagement at the insert-tube interface. As noted in the Graham patent, when the temperature in the heat exchanger rises, the tube expands and compresses the gasket against the insert, thereby forming a very good seal and reducing leakage to a minimum. See the Graham patent at column 3, lines 65–68. However, since the gasket provides an axial connection between the gasket and the insert/tube combination, the axial expansion of the tube also results in an outward pressure against the wall. At extreme temperatures or with longer tubes, this pressure forces the wall to bow outward, thereby creating stability problems and/or cracks resulting in air stream leakage. In addition, this pressure results in high compressive forces on the ceramic tube itself which could lead to stress-induced tube failure.

Accordingly, it is an object of the present invention to provide a ceramic heat exchanger in which axial expansion of its tubes does not result in undue pressure upon its walls or the ceramic tube, thereby maintaining a stable configuration.

SUMMARY OF THE PRESENT INVENTION

In accordance with the present invention, there is provided a ceramic heat exchanger comprising: an annular seal for use in a heat exchanger connection comprising a tube and at least one annular seal, wherein the annular seal is compression seated upon the outside diameter of the tube.

DETAILED DESCRIPTION OF THE INVENTION

It has been found that the use of a seal between the outer diameter of the tube and the inner diameter of the threaded insert provides the sealing engagement necessary to limit leakage without bowing the walls of the heat exchanger.

Figure 1:
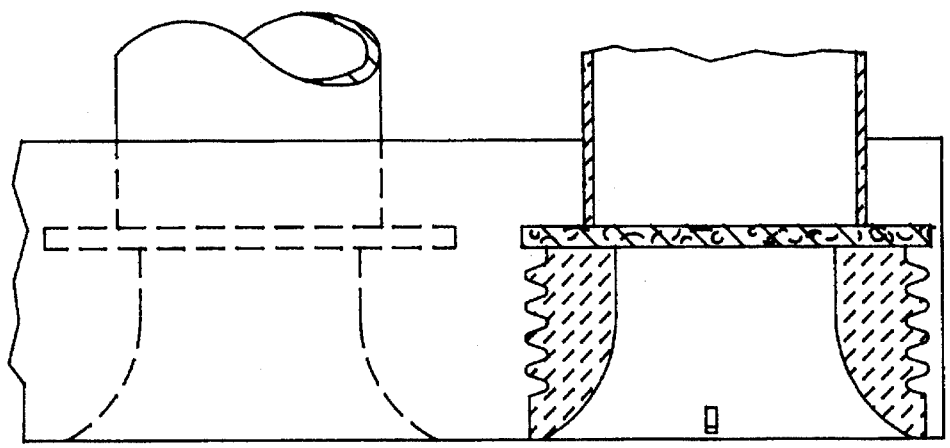
FIG. 1 is a cross-sectional view of the conventional tube-insert connection, as disclosed in the Graham patent.
Figure 2:
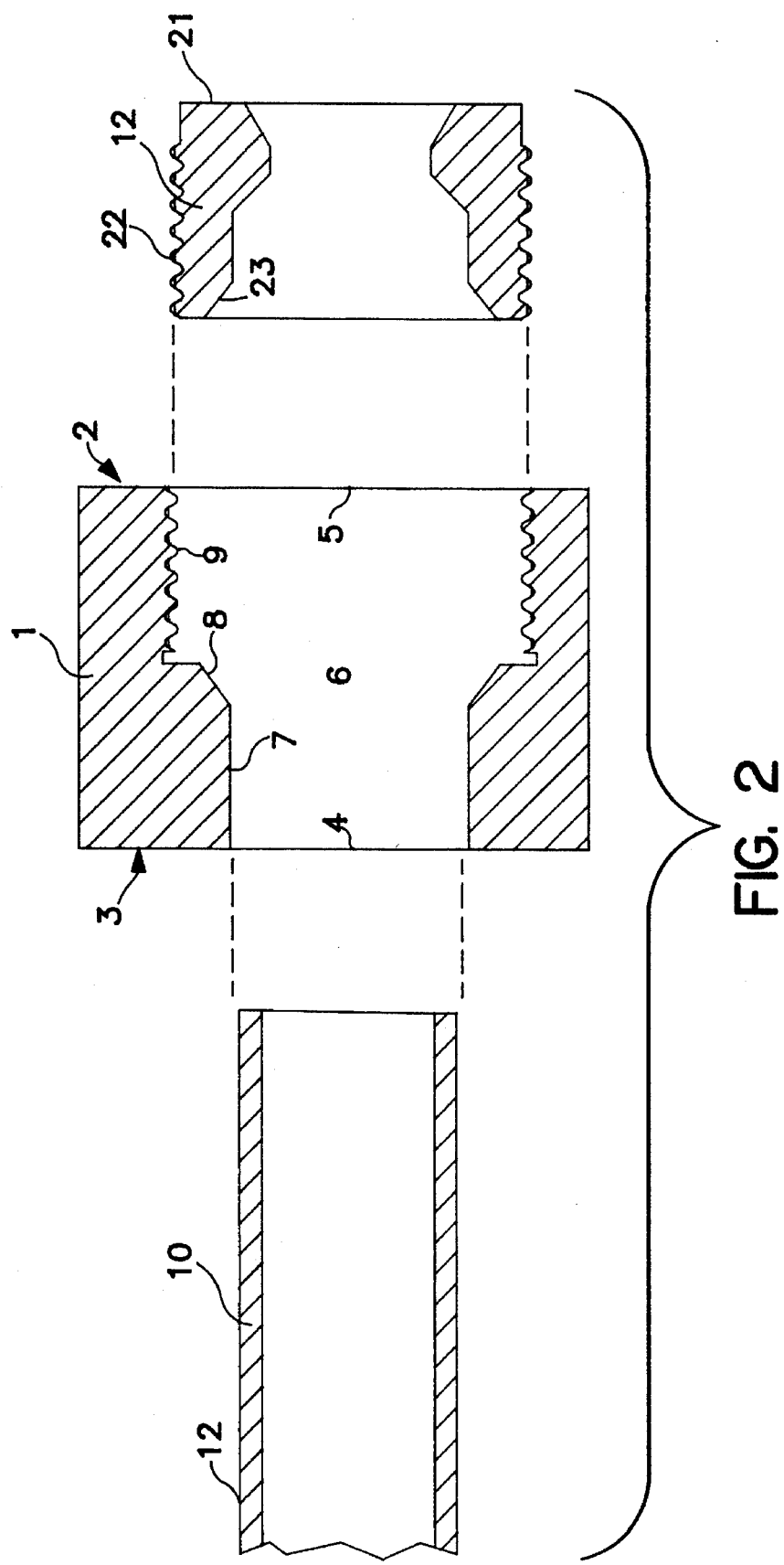
FIG. 2 is an exploded, cross sectional view of the tube/wall/insert connection of the present invention.

Referring now to FIG. 2, an exploded, cross-sectional view of one embodiment of the present invention, there is provided a receiving wall 1. Receiving wall 1 has an outside face 2, an inside face 3 and an passage 6 extending from outside face 2 to inside face 3, thereby forming inside opening 4 and outside opening 5.

Passage 6 is comprised of three sections. The first section extends from inside face 3 and is comprised of a barrel 7 having a constant diameter. The second section is a cone 8 having the same diameter as barrel 7 at its junction therewith tapering outwardly to a larger diameter at its opposite end. The third section of passage 6 extends to outside opening 5 and is a threaded barrel 9 having essentially the same diameter as the largest diameter of cone 8.

Tube 10 is a hollow cylinder having an outside diameter 12 slightly smaller than inside opening 4. The slightly smaller outside diameter 12 of tube 10 allows it to be easily slid into passage 6.

To provide for access to the tube 10, threaded insert 12 is screwed into threaded barrel 9 through outside opening 5. Threaded insert 12 has an outside face 21, a threaded circumference 22 to engage the threaded barrel 9 and an inside face 23.

Figure 3:
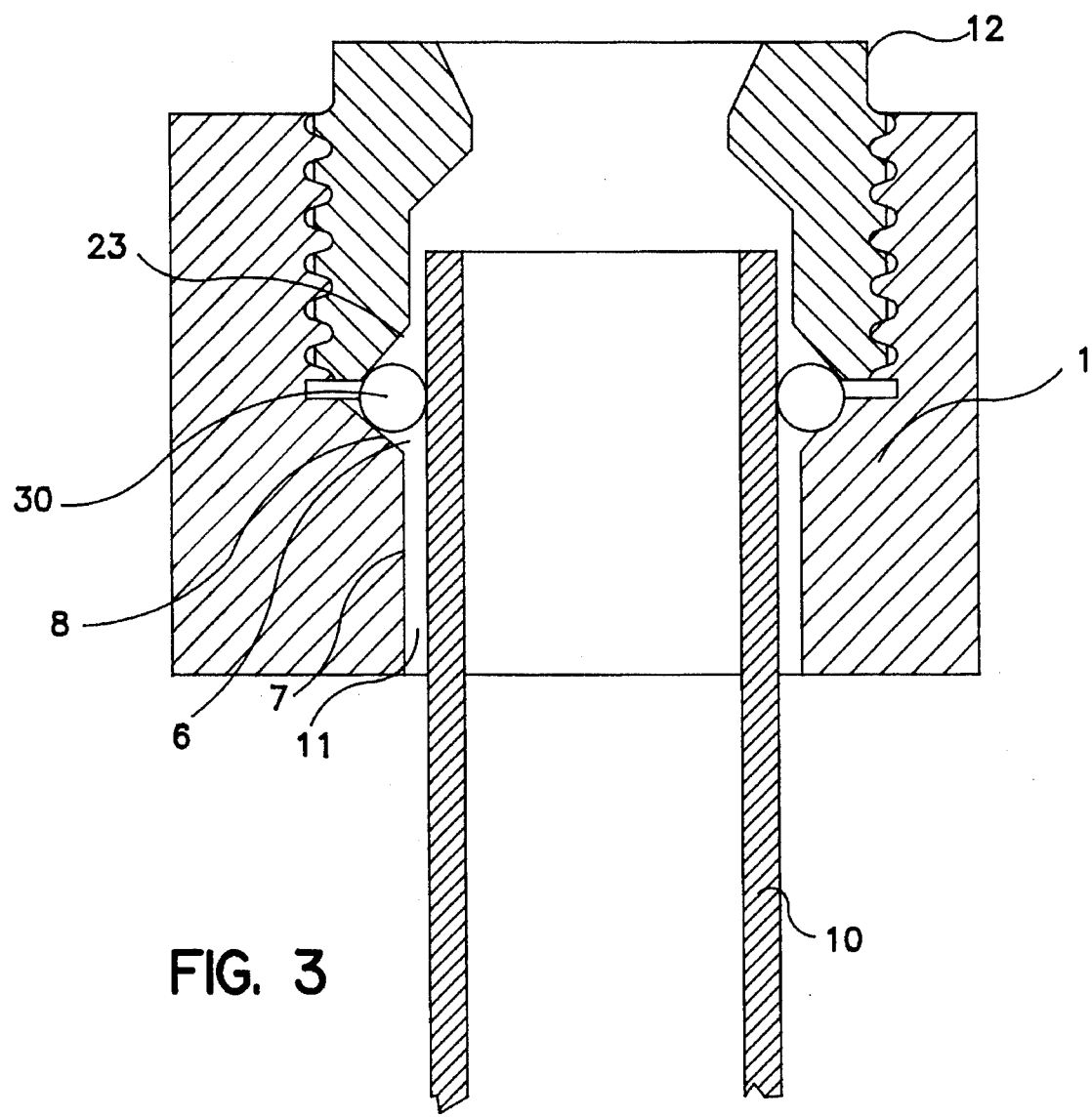
FIG. 3 is a cross sectional view of the tube/wall/insert connection of the present invention.

Referring now to FIG. 3, a cross sectional view of one embodiment of the present invention, both tube 10 and insert 12 are inserted into receiving wall 1. When tube 10 is slid into passage 6, a channel 11 is defined by the difference in the diameters of the tube 10 and the barrel 7. In addition, inside face 23, a portion of tube 10 and cone 8 define an annular void connected to channel 11.

Filling the annular void is seal ring 30. The dimensions of seal ring 30 are such that it provides a sealing engagement between inside face 23, tube 10 and cone 8 (i.e., the threaded insert, the hollow tube and the receiving wall), thereby preventing leakage from the clean air which travels through the tube 10 to the contaminated air passing over tube 10. Tightening threaded insert 12 into receiving threaded barrel 9 deforms and compresses seal ring 30 to achieve a tighter seal with tube 10.

Because the present invention concerns an improved sealing engagement between tube 10 and receiving wall 1, any conventional tube configuration and housing design may be used in accordance with the present invention. In some embodiments, the tube configuration and housing design used in accordance with the Graham patent are adopted. The portions of the specification of the Graham patent which disclose conventional tube configurations and housing designs are hereby incorporated by reference.

Tube 10 may be made of any material commonly used as heat exchangers tubes, including metallic or ceramic materials. Preferably, tube 10 is made of silicon carbide. More preferably, it is made out of nitride bonded silicon carbide (most preferably, ADVANCER®, available from the Norton Company of Worcester, Mass.), recrystallized silicon carbide, or siliconized, recrystallized silicon carbide (most preferably, CRYSTAR®, available from the Norton Company).

Figure 4:
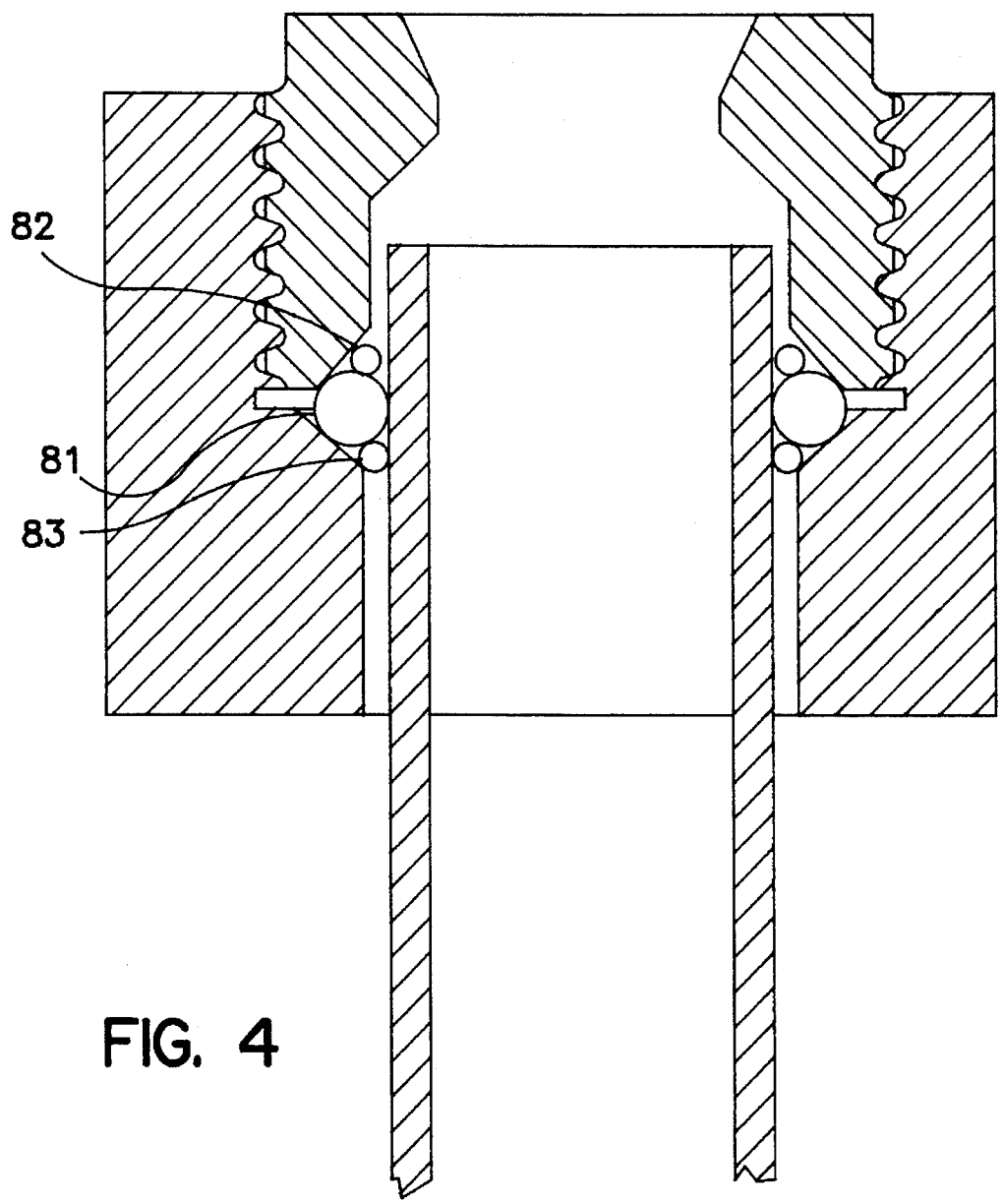
FIGS. 4 and 5 are embodiment of the present invention having three annular seals.
Figure 5:
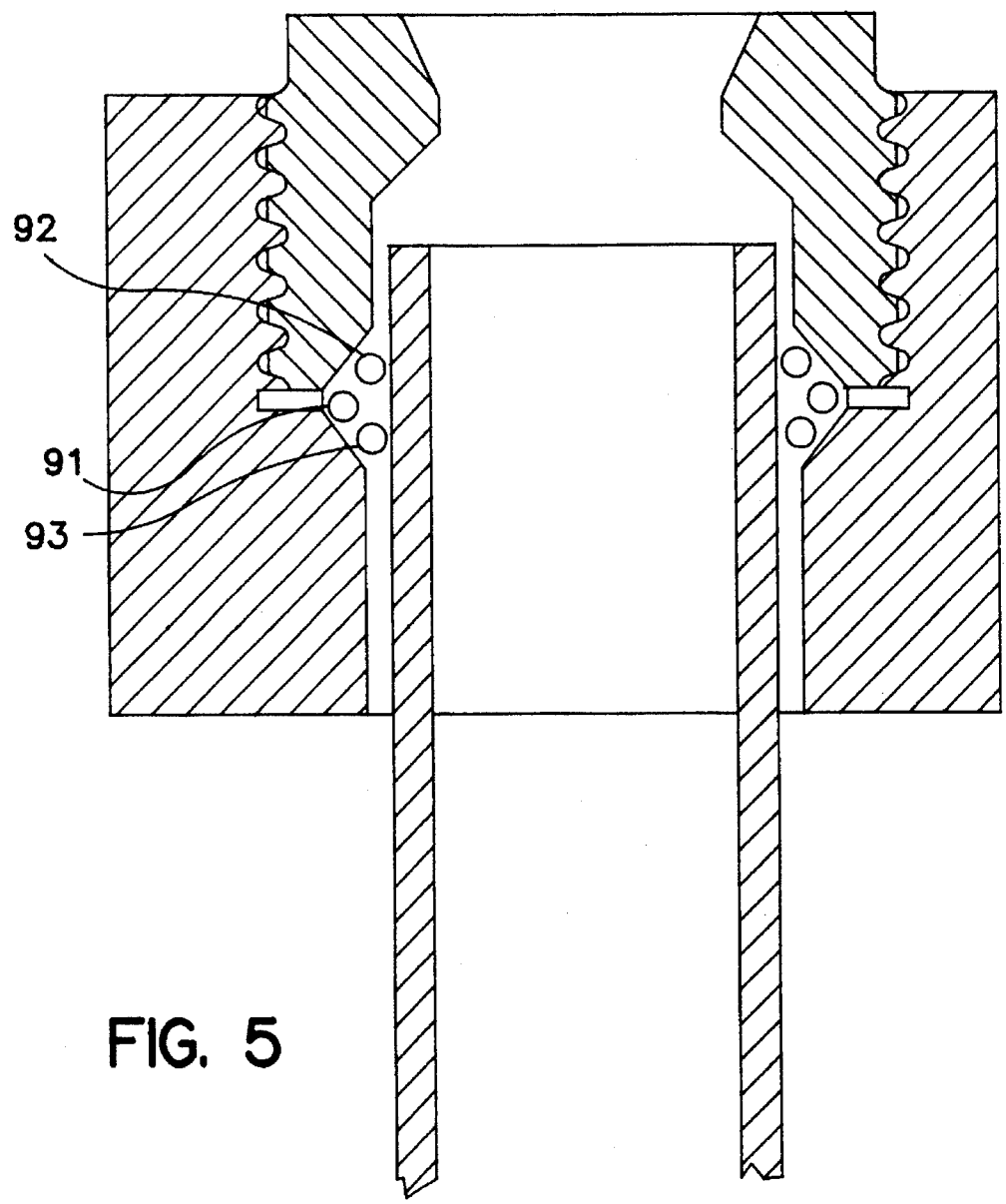

Seal ring 30 (also called an "annular seal") may be made of any material which can provide a sealing engagement between inside face 23, tube 10 and cone 8 while withstanding the harsh environment provided by the waste fluid. In particular, it may be any compressible medium or configuration that is resistant to heat and corrosion, such as ceramic fibers, elastomers, fluoropolymers, carbon (graphite) and alloys. Preferably, the seal 30 is made of a ceramic material such as alumina-silica braided fiber rope. Although a single seal ring is used in preferred embodiments, two or more seal rings may be employed in the annular void to provide the necessary sealing engagement. When three rings are used, for example, as in FIG. 4 one of the rings 81 may be larger than and placed in the middle of the others, 82 and 83, as in FIG. 5, or the seal rings may be of equal size and placed in a triangle configuration by mounting one seal 91 upon two seals 92 and 93. Although the seal rings preferably possess a circular cross-section, they may be made to have non-circular cross-sections (i.e., a triangular or square) to accommodate a similarly shaped void.

Although described in the FIG. 2 and 3 above as separate parts, the threaded insert and the wall can be an integral component in some embodiments of the present invention. However, the ease of tube replacement afforded by the use of the threaded insert is sacrificed, as is the ability to achieve a better seal by tightening the threaded insert, thereby compressing the seal ring. In other embodiments, the joining of the insert and the wall is accomplished by a bayonet ("key-type") locking mechanism.

Any conventional heat exchanger may use the sealing connection of the present invention. Preferably, the housing of the heat exchanger as well as the multi-pass design disclosed in U.S. Pat. No. 4,632,181 ("Graham") is used.

We claim:

1. A heat exchanger connection comprising a ceramic tube and at least one annular seal, wherein the at least one annular seal is compression seated upon the outside diameter of the tube, wherein the heat exchanger connection comprises a ceramic receiving wall having a passage larger cross section than the tube, the tube and the passage being in coaxial alignment and defining a channel, wherein the at least one annular seal prevents fluid from passing through the channel, and wherein the heat exchanger connection further comprises a threaded ceramic insert which screws into the receiving wall, thereby compressing the at least one seal against the receiving wall.

2. The heat exchanger connection of claim 1 wherein the seal is fibrous.

3. The heat exchanger connection of claim 1 wherein the seal is comprised of a ceramic material.

4. The heat exchanger connection claim 3 wherein the seal is fibrous.

5. The heat exchanger connection of claim 4 wherein the ceramic material comprises alumina.

6. The heat exchanger connection of claim 5 wherein the ceramic material further comprises silica.

7. The heat exchanger connection of claim 1 wherein the seal is fibrous.

8. The heat exchanger connection of claim 1 wherein the seal is comprised of a ceramic material.

9. The heat exchanger connection of claim 8 wherein the seal is fibrous.

10. The heat exchanger connection of claim 9 wherein the ceramic material comprises alumina.

11. The heat exchanger connection of claim 1, wherein the tube comprises a ceramic material.

12. The heat exchanger connection of claim 1, wherein the tube comprises silicon carbide.

13. The heat exchanger connection as described in claim 9 comprising at least two annular seals compression seated upon the outside diameter of the tube.

14. A heat exchanger connection as described in claim 9 comprising three annular seals compression seated upon the outside diameter of the tube.

15. The heat exchanger connection of claim 14, wherein the three seals form a triangular configuration.

16. The heat exchanger connection of claim 15, wherein the triangular configuration is formed by placing a larger seal between two smaller seals.

17. The heat exchanger connection of claim 15, wherein the triangular configuration is formed by mounting one seal upon two seals.

18. A heat exchanger connection comprising:
   a) a ceramic receiving wall having an outside face, an inside face and a passage extending from the outside face to the inside face, thereby forming an inside opening and an outside opening;
   said passage comprising:
      i) a first section depending from the inside face and comprising a barrel having a constant diameter,
      ii) a second section having the same diameter as the barrel at its junction therewith tapering outwardly to a larger diameter at its opposite end, and
      iii) a third section having essentially the same diameter as the cone at its junction therewith, said third section being threaded;
   b) a hollow ceramic tube having an outside diameter slightly smaller than the inside opening of the receiving wall;
   c) a channel formed by the difference in the diameters of the tube and the passage;
   d) a threaded ceramic insert having an outside face, a threaded circumference to engage the threaded third section of the receiving wall and an inside face, wherein said threaded insert is screwed into the threaded third section of the receiving wall through the outside opening of the receiving wall;
   e) an annular void defined by the inside face of the threaded insert, the outside diameter of the hollow tube and the section of the passage, said annular void in fluid communication with the channel; and
   f) a seal ring providing a sealing engagement between the threaded insert, the hollow tube and the receiving wall, wherein the seal ring is compressed by the threading action of the threaded ceramic insert.

\* \* \* \* \*